(12) United States Patent
Jiang

(10) Patent No.: US 11,985,745 B2
(45) Date of Patent: May 14, 2024

(54) DEVICE AND METHOD FOR REDUCING JITTER OF LIGHT SOURCE UNDER LOW BRIGHTNESS, AND LIGHT FIXTURE

(71) Applicant: Guangzhou Haoyang Electronic Co., Ltd., Guangdong (CN)

(72) Inventor: Weikai Jiang, Guangdong (CN)

(73) Assignee: GUANGZHOU HAOYANG ELECTRONIC CO., LTD., Guangdong (CN)

( * ) Notice: Subject to any disclaimer, the term of this patent is extended or adjusted under 35 U.S.C. 154(b) by 104 days.

(21) Appl. No.: 17/815,938

(22) Filed: Jul. 28, 2022

(65) Prior Publication Data
US 2023/0135009 A1 May 4, 2023

Related U.S. Application Data

(63) Continuation of application No. PCT/CN2021/133897, filed on Nov. 29, 2021.

(30) Foreign Application Priority Data

Nov. 1, 2021 (CN) .......................... 202111284282.9

(51) Int. Cl.
*H05B 45/325* (2020.01)
*H05B 45/10* (2020.01)
*H05B 45/36* (2020.01)
*H05B 45/59* (2022.01)

(52) U.S. Cl.
CPC ............. *H05B 45/59* (2022.01); *H05B 45/10* (2020.01); *H05B 45/325* (2020.01); *H05B 45/36* (2020.01)

(58) Field of Classification Search
CPC ........ H05B 45/10; H05B 45/30; H05B 45/32; H05B 45/325; H05B 45/36; H05B 45/59; H05B 47/10
See application file for complete search history.

(56) References Cited

U.S. PATENT DOCUMENTS

2010/0289426 A1* 11/2010 Takasaka ............. H05B 45/325
  315/250

* cited by examiner

*Primary Examiner* — Jimmy T Vu
(74) *Attorney, Agent, or Firm* — MUNCY, GEISSLER, OLDS & LOWE, PC

(57) ABSTRACT

A device for reducing jitter of a light source under low brightness is provided. A first end of the switch is for inputting a voltage, and a second end thereof is connected to one end of the inductor. The other end of the inductor is connected to the LED light source. The current control module is connected to the second end of the switch and the first end of the inductor, and a second end of the current control module is grounded. The current acquisition module is used for detecting a current and connected to the signal control module, and sends a current signal into the signal control module according to the current detected. The signal control module is connected to the switch and used for controlling the switch to be disconnected or connected according to the received current signal or a pre-set time threshold.

11 Claims, 5 Drawing Sheets

DEVICE AND METHOD FOR REDUCING JITTER OF LIGHT SOURCE UNDER LOW BRIGHTNESS, AND LIGHT FIXTURE

CROSS REFERENCE TO RELATED APPLICATIONS

The present application is a continuation of International Application No. PCT/CN2021/133897, filed on Nov. 29, 2021, which claims priority from Chinese Patent Application No. 202111284282.9 filed on Nov. 1, 2021, all of which are hereby incorporated herein by reference.

TECHNICAL FIELD

The present invention relates to the field of semiconductor lighting equipment, and more particularly, relates to a device and method for reducing jitter of a light source under low brightness, and a light fixture thereof.

BACKGROUND

As known, human eyes are sensitive to changes in light in a dark environment. In pitch darkness, faint changes in the fluorescent flicker of fireflies can be seen. However, the human eyes are numb to changes in light in a strong light environment. For example, under the scorching sun, lumens difference cannot be sensed when one candle or two candles is light on.

According to the existing light fixtures, current ripples may be generated in the driving circuit, resulting in light flicker and jitter during light adjusting process of the light fixture, which may be more obvious under relatively low brightness. For example, in a scenario of stage performance, referring to FIG. 1 showing current curve of the light fixture changing with the time, when the light fixture is adjusted from dark to bright (referred as to light adjusting under low brightness) or from bright to dark at a constant rate slowly (such as 30 in seconds), the curve appears many sawteeth which shows current ripples are generated in a case of maximum current. The current ripple may cause instability of current, such as current increment, current decrement, or abrupt change of current, which causes light jitter or flicker. Such jitter or flicker seems obvious when the brightness is relatively low, and thus is easy to be sensed. It will be more serious when observing with a camera, thereby greatly influencing the stage effect.

However, the current ripples in the existing driving circuit can only be reduced, which cannot be eliminated. Even if the current ripples are adjusted to be every small, it will also be exposed to the light adjusting process under low brightness.

SUMMARY

The present invention thus provides a device and method for reducing jitter of a light source under low brightness and a light fixture, which can avoid light flicker or jitter caused by current ripples during light adjusting under low brightness.

According to one aspect, a device for reducing jitter of a light source under low brightness is provided, which includes an LED light source, an inductor L, a current control module, a switch K1, a signal control module, a current acquisition module and a signal sending module.

A first end of the switch K1 is used for inputting a voltage $V_{in}$, and a second end of the switch K1 is connected to a first end of the inductor L.

A second end of the inductor L is connected to an anode of the LED light source, and a cathode of the LED light source is grounded.

A first end of the current control module is connected to the second end of the switch K1 and the first end of the inductor L, and a second end of the current control module is grounded. When the switch K1 is connected, the current control module is in non-conducting state, and when the switch K1 is disconnected, the current control module is in conducting state.

The current acquisition module is used for detecting a current flowing through the inductor L when the inductor L is charged, and is connected to the signal control module, and configured for sending a current signal to the signal control module according to the detected current.

The signal control module is also connected to the switch K1 and used for controlling the switch K1 to be disconnected or connected according to the received current signal or a pre-set time threshold.

The signal sending module is connected to the signal control module, and used for sending a PWM control signal to the signal control module. The signal control module is configured to judge whether to control the switch K1 according to the PWM control signal.

The input voltage $V_{in}$, a voltage $V_{LED}$ of the LED light source, the rated maximum current $i_{max}$ of the LED light source, the frequency f of the PWM control signal and the inductance of the inductor L satisfy the following relationship.

$$0.2 \leq \frac{i_{max} \cdot f \cdot l}{V_{in} - V_{LED}} \leq 0.4$$

According to the present invention, it is preferable to satisfy the following relationship.

$$\frac{i_{max} \cdot f \cdot l}{V_{in} - V_{LED}} = 0.3$$

According to the present invention, the current acquisition module is pre-set a current threshold. When the current detected by the current acquisition module reaches the current threshold, the current signal is sent to the signal control module to control the switch K1 to be disconnected.

The signal control module is pre-set the time threshold. When the time for the switch K1 being disconnected exceeds the time threshold, the signal control module controls the switch K1 to be connected.

According to the present invention, a first end of the current acquisition module inputs the voltage $V_{in}$, and a second end of the current acquisition module is connected to the first end of the switch K1.

Alternatively, the first end of the current acquisition module is connected to the second end of the switch K1, and the second end of the current acquisition module is connected to the first end of the current control module and the first end of the inductor L.

According to the present invention, the current control module can be a diode D1, a cathode of the diode D1 is connected to the first end of the inductor L and the second end of the switch K1, and an anode of the diode D1 is grounded.

According to the present invention, the current control module can also be a switch K2, a first end of the switch K2 is connected to the first end of the inductor L and the second end of the switch K1, and a second end of the switch K2 is grounded. When the switch K1 is connected, the switch K2 is disconnected, and when the switch K1 is disconnected, the switch K2 is connected.

According to the present invention, when the current control module is the switch K2, the switch K2 is also connected to the signal control module. The signal control module thus can control the switch K2 to be connected or disconnected.

In the second aspect, a method for reducing jitter of the light source under low brightness is further provided, which is used for controlling the current change rate of the LED light source in the device for reducing jitter of the light source under low brightness as described, which includes the steps of reducing the current change rate k of a current flowing through the LED light source so that the current flowing through the LED light source does not generate current ripples under low brightness.

According to the present invention, the method of reducing the current change rate k of the current flowing through the LED light source specifically includes increasing the inductance of the inductor L.

According to the present invention, the method for reducing the current change rate k of the current flowing through the LED light source can also include reducing an input voltage $V_{in}$ to approach a voltage $V_{LED}$ of the LED light source.

In the third aspect, a light fixture is provided, which includes the device for reducing jitter of the light source under low brightness as mentioned above, and a dimmer. The dimmer is used for adjusting the inductance of an input voltage $V_{in}$ of the device and/or the inductance of an inductor L of the device before the LED light source emits light.

Compared with the prior art, some beneficial effects of the present invention can be obtained. The device according to the present invention can control the charging and discharging of the inductor L by controlling the switch K1 to be disconnected or connected, and can still supply current to the LED light source to continue to emit light due to the characteristics of the inductor L, even when the switch K1 is disconnected.

According to the device of the present invention, in one PWM period, time for the current rising can be increased and the time when the current is maintained at the maximum can be shortened, as current ripples may be generated when the current is maintained at the maximum, which causes light flicker or jitter. That is, by adjusting the input voltage $V_{in}$ and/or the inductance of the inductor L, the present application reduces the current change rate k, prolongs the time for the current rising to reach $i_{max}$, and shortens the time when the current is maintained at the maximum. Accordingly, the time of the current ripple is shortened and light flickers or jitters of the light source during light adjusting under low brightness can be avoided.

DETAILED DESCRIPTION

Figure 1:
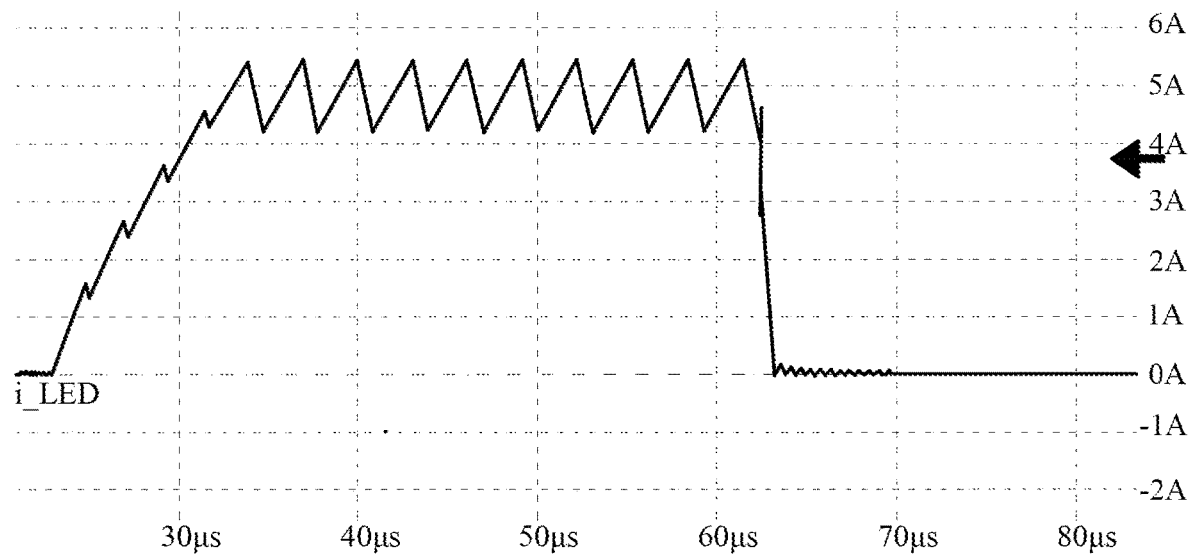
FIG. 1 is a diagram showing current i_LED change with time according to a prior art.

The accompanying drawings of the present invention are only used for exemplary illustration, and should not be understood as limiting the present invention. In order to better illustrate the following embodiments, some parts in the drawings may be omitted, enlarged or reduced, and do not represent the size of the actual product; for those skilled in the art, it is understandable that some well-known structures and their descriptions in the drawings may be omitted.

Figure 2:
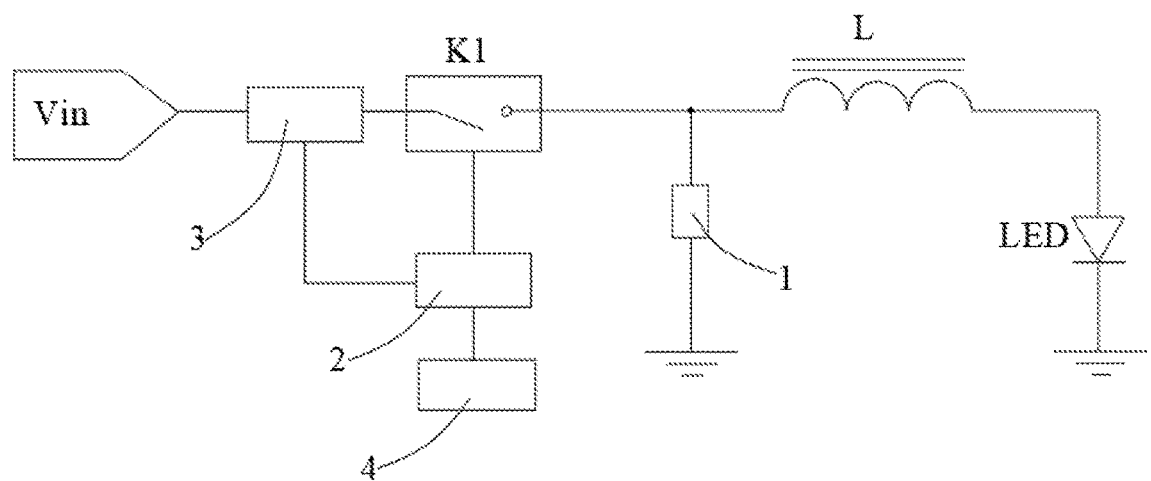
FIG. 2 is a structural diagram of a device for reducing jitter of a light source under low brightness according to one embodiment.

Referring to FIG. 2, a device for reducing jitter of a light source under low brightness according to one embodiment is provided, which includes an LED light source, an inductor L, a current control module 1, a switch K1, a signal control module 2, a current acquisition module 3 and a signal sending module 4.

According to the present invention, a first end of the switch K1 is used for inputting a voltage $V_{in}$, and a second end of the switch K1 is connected to a first end of the inductor L.

A second end of the inductor L is connected to an anode of the LED light source, and a cathode of the LED light source is grounded.

A first end of the current control module 1 is connected to the second end of the switch K1 and the first end of the inductor L, and a second end of the current control module 1 is grounded. When the switch K1 is connected, the current control module 1 is in non-conducting state, and when the switch K1 is disconnected, the current control module 1 is in conducting state.

The current acquisition module 3 is used for detecting a current flowing through the inductor L when the inductor L is charged. The current acquisition module 3 is connected to the signal control module 2 and sends a current signal to the signal control module 2 according to the detected current.

The signal control module 2 is connected to the switch K1 and used for controlling the switch K1 to be disconnected or connected according to the received current signal or a pre-set time threshold.

The signal sending module 4 is connected to the signal control module 2 and used for sending a PWM control signal to the signal control module 2, so that the signal control module 2 can judge whether to control the switch K1 to be disconnected or connected according to the PWM control signal.

The input voltage $V_{in}$, a voltage $V_{LED}$ of the LED light source, the rated maximum current $i_{max}$ of the LED light source, the frequency f of the PWM control signal and the inductance l of the inductor L satisfy the relationship.

$$0.2 \le \frac{i_{max} \cdot f \cdot l}{V_{in} - V_{LED}} \le 0.4$$

The device according to the present embodiment can control the inductor L to be charged or discharged by controlling the switch K1 to be connected or disconnected. Due to the characteristics of the inductor L, the LED light source can be supplied current to continue to emit light, even when the switch K1 is disconnected.

The current acquisition module 3 is configured to detect a current in the device when the inductor L is charged, and send the current signal into the signal control module 2 according to the detected current, so that the signal control module 2 can control the switch K1 to be disconnected or connected according to the received current signal. According to the present embodiment, the signal control module 2 controls the switch K1 to be connected according to the pre-set time threshold.

Specifically, when the switch K1 is connected, the current in the device will gradually increase, and the inductor L is charged, a current on the LED light source thus will gradually rise. The current on the LED light source will keep stably rising until the current acquired by the current acquisition module 3 reaches a current threshold. When the current acquired by the current acquisition module 3 reaches the current threshold, the current acquisition module 3 sends the current signal to the signal control module 2. The signal control module 2 controls the switch K1 to be disconnected, the inductor L is thus discharged, the current continues to flow to the LED light source, however, the value of the current changes to some extent. When the pre-set time threshold is reached, the signal control module 2 controls the switch K1 to be connected again.

It is noted that for the situation that the current acquisition module 3 detects the current in the device when the inductor L is charged, the following cases is included but not limited. The current acquisition module 3 can detect the current in the device only when the inductor L is charged, or the current acquisition module 3 can detect the current in the device both when the inductor L is charged and discharged.

When the LED light source reaches the current threshold, current ripples will be generated as the inductor L needs to be charged and discharged repeatedly to maintain the current stable, while the current is changed to some extent.

According to the embodiment, the signal control module 2 judges whether to control the switch K1 according to the PWM control signal sent by the signal sending module 4. Specifically, when the PWM signal is at a high level, the signal control module 2 works normally and can control the switch K1 to be connected or disconnected according to the current signal sent by the current acquisition module 3. Therefore, the device works normally, the current on the LED light source is not 0, and the LED light source thus can emit light. However, when the PWM control signal is at a low level, the signal control module 2 will not work, that is, the switch K1 cannot be controlled to be connected or disconnected according to the current signal sent by the current acquisition module 3. Accordingly, at this situation, the device stops working, the current on the LED light source is 0, and the LED light source thus cannot emit light.

In the present embodiment, in a PWM period of the PWM control signal, the ratio T of the time required for the current in the LED light source to rise continuously to reach the rated maximum current $i_{max}$ of the LED light source to the PWM period $T_{PWM}$ of the PWM control signal is:

$$T = \frac{i_{max} \cdot f \cdot l}{V_{in} - V_{LED}}$$

the origin of which will be described hereafter, wherein $V_{in}$ is the input voltage, $V_{LED}$ is the voltage of the LED light source, $i_{max}$ is the rated maximum current of the LED light source, f is the frequency of the PWM control signal, and l is the inductance of the inductor L.

Figure 3:
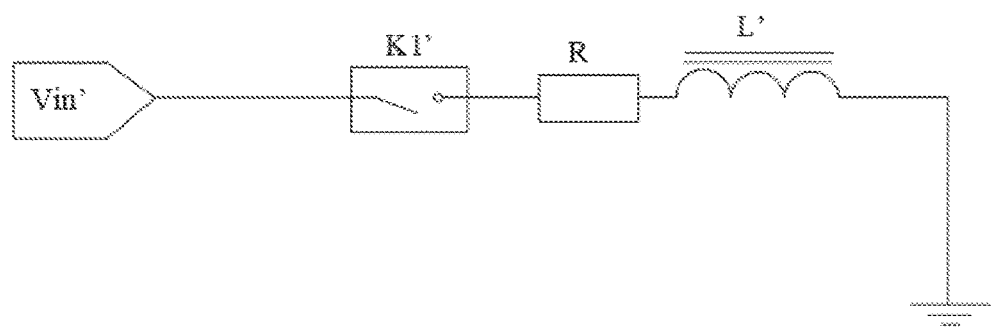
FIG. 3 is a simplified circuit model diagram according to one embodiment.

FIG. 3 shows a simplified LR circuit model, which includes a switch K1', a load R, and an inductor L' connected in series. The inductor L' is grounded, and one end of the switch K1' is input a voltage $V_{in}$'. The current change rate k of the current can be obtained based on the simplified LR circuit model.

According to LR circuit characteristics, a charging current of the inductor L' is:

$$i(t) = \frac{V'_{in}}{R}(1 - e^{-\frac{R}{L'}t});$$

wherein $V_{in}$' is the value of an input voltage in the simplified circuit model, R is the value of a resistor in the simplified circuit model, L' is the inductance of an inductor in the simplified circuit model, t is charging time, and e is a Euler constant.

Derivation on both sides of the above formula is performed:

$$\frac{di(t)}{dt} = \frac{V'_{in}}{R}(\frac{R}{L'}e^{-\frac{R}{L'}t}).$$

When the resistance R tends to zero, it is obtained by simplification:

$$\left.\frac{di(t)}{dt}\right|_{R \to 0} = \frac{V'_{in}}{L'}.$$

Physically, the derivative of the current is the current change rate of the current.

As mentioned above, since the resistance R tends to zero, $V_{in}$' is equivalent to a voltage $V_L$' on the inductor L', i.e. $V_{in}$'=$V_L$'. It is obtained:

$$\left.\frac{di(t)}{dt}\right|_{R \to 0} = \frac{V'_L}{L'}.$$

With regard to the device of the embodiment shown in FIG. 2, $V_{in}$'=$V_{in}$, $V_L$'=$V_L$, L'=l, the LED light source can be regarded as the load R, and the resistance of the LED light source is very small which can also be regarded as tending to 0. It is obtained:

$$k = \frac{V'_L}{L'} = \frac{V_L}{l}.$$

Referring back to FIG. 2, the LED light source may cause a voltage change. It can be understood that $V_L = V_{in} - V_{LED}$, wherein $V_L$ is the voltage of the inductor L of the device of the present embodiment, $V_{in}$ is the input voltage of the device of the present embodiment, $V_{LED}$ is the voltage of the LED light source of the device of the present embodiment. The current change rate k of the current flowing through the LED light source thus is:

$$k = \frac{V_{in} - V_{LED}}{l}.$$

Figure 4:
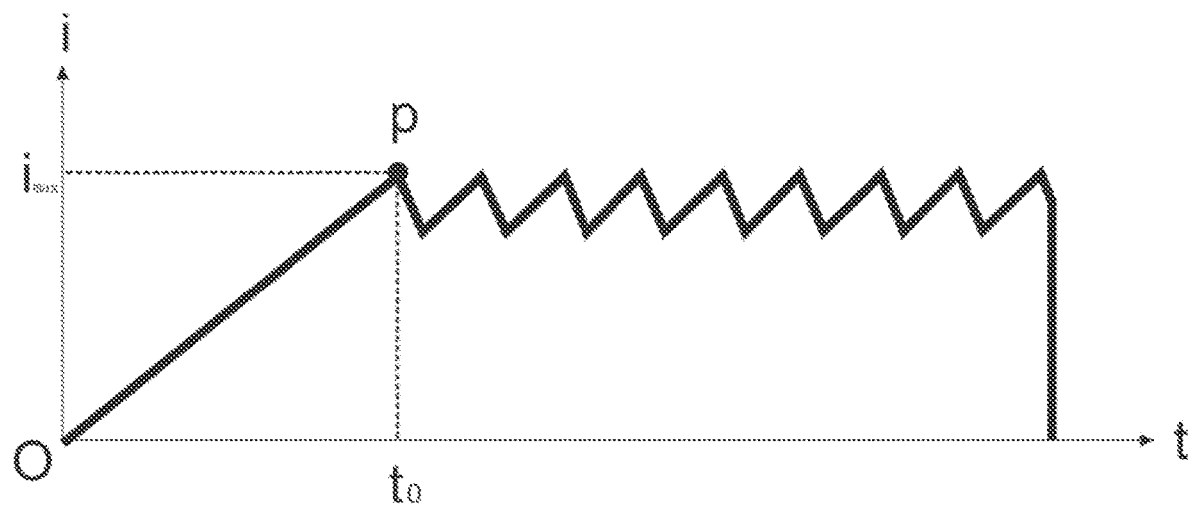
FIG. 4 is a diagram showing current i_LED change of an LED light source with time according to one embodiment.

FIG. 4 is a diagram showing the relation between a current i_LED on the LED light source of the device according to the present embodiment and time t. In FIG. 4, $t_0$ is the time required for the current of the LED light source to rise continuously to a first peak point P, namely reaching the rated maximum current $i_{max}$ of the LED light source within one period $T_{PWM}$ of the PWM control signal, and the period $T_{PWM}$ is the reciprocal of the frequency f of the PWM control signal. It is obtained that $$t_0 = T \cdot T_{PWM} = \frac{T}{f}.$$

Point P is the first current peak point of the current of the LED light source, the corresponding peak current $i_{max}$ is known, so that the peak current $i_{max}$ can be set as the current threshold of the current acquisition module 3 of the present embodiment.

The slope of a straight line OP is the current change rate k of the current of the LED light source, and it can be obtained that:

$$k = \frac{i_{max} - 0}{t_0 - 0} = \frac{i_{max} \cdot f}{T}.$$

In combination with the above-derived relational expression of the current change rate k, it can be obtained that:

$$\frac{V_{in} - V_{LED}}{l} = \frac{i_{max} \cdot f}{T}.$$

By formula transformation, it can be obtained that:

$$T = \frac{i_{max} \cdot f \cdot l}{V_{in} - V_{LED}}.$$

According to the present embodiment, preferably, within one PWM period, during the time required for the current to rise to the rated maximum current $i_{max}$ of the LED light source, the current on the LED light source continues to rise, however, since it is subsequently required to repeatedly charge and discharge the inductor L to maintain the current at about $i_{max}$, the repeated charging and discharging of the inductor L inevitably causes a small amplitude change in the current, which generates current ripples. Therefore, it is possible to reduce the current ripples generated in one PWM period by appropriately shortening the time for the current to be maintained about $i_{max}$. Preferably, the ratio T of the time required for the current in the LED light source to rise continuously within one PWM period to the PWM period $T_{PWM}$ is set between 0.2 and 0.4. Compared to the prior art, by appropriately increasing the value of T, the time during which the current on the LED light source rises can be increased and the time for current ripples is shortened, thereby prolonging the time for the brightness of the LED light source to change smoothly.

The ratio T of the time required for the current in the LED light source to rise continuously in one PWM period to the PWM period $T_{PWM}$ of the PWM control signal may be preferably set as 0.3, according to the embodiment, namely $$\frac{i_{max} \cdot f \cdot l}{V_{in} - V_{LED}} = 0.3.$$

With such configuration, the time for the brightness of the LED light source to change smoothly can be prolonged properly, without too long PWM period, which can avoid too long time required for the current on LED light source to reach the rated maximum current $i_{max}$.

According to the present embodiment, preferably $V_{in} - V_{LED} \leq v$. Reducing the value of $V_{in} - V_{LED}$ as much as possible can increase the ratio T of the time required for the current in the LED light source to rise continuously to the PWM period $T_{PWM}$, so that the time without current ripple in one PWM period can be prolonged.

According to the present embodiment, the current acquisition module 3 is pre-set the current threshold. When the current detected by the current acquisition module 3 reaches the current threshold, a current disconnection signal is sent to the signal control module 2. The signal control module 2 thus controls the switch K1 to be disconnected.

According to the present embodiment, the signal control module 2 is pre-set the time threshold. When it is detected that the time for the switch K1 being disconnected exceeds the time threshold, the switch K1 is controlled to be connected.

Based on the pre-set current threshold and time threshold, the working process of the device according to the present embodiment is as follows.

The device starts to work once the voltage $V_{in}$ is input. Firstly, the signal control module 2 outputs a connection signal to the switch K1 to connect the switch K1, the inductor L is charged, and the current control module 1 is in non-conducting state. A current loop in this situation includes the switch K1, the inductor L and the LED light source. The current flows to the LED light source, and the current on the LED light source starts to rise. When the current in the device acquired by the current acquisition module 3 reaches the pre-set current threshold, the current acquisition module 3 will send the current signal to the signal control module 2, and the signal control module 2 outputs a disconnection signal to the switch K1 to disconnect the switch K1. At this time, the inductor L is discharged, the current control module 1 is in conducting state. The current loop in this situation includes the inductor L, the LED light source and the current control module 1. The current still flows to the LED light source, but value of the current will decrease to some extent. When the time of the inductor L being discharged reaches the pre-set time threshold, the signal control module 2 will control the switch K1 to be connected again. With the input voltage $V_{in}$, the inductor L is charged again, and the value of the current increases compared with that when the inductor L is discharged. When the current reaches the current threshold again, under the action of the current acquisition module 3 and the signal control module 2, the switch K1 is controlled to be disconnected, and the inductor L is discharged again. The inductor L is thus repeatedly charged and discharged in such way to provide a continuous current for the LED light source.

It can be understood that the current ripples are generated due to the change in the current value when the inductor L is repeatedly charged and discharged, it is thus only necessary to set the process of discharging the inductor L subsequent to the current being rising from 0 to the current threshold, the current ripples in the process of the current rising to reach the current threshold can be eliminated. Therefore, the LED light source can gradually be brightened under a stable rising current. Accordingly, when the LED light source is subjected to light adjusting under low brightness, the current can steadily rise from 0, so that the LED light source can be steadily brightened without flicker or jitter.

According to the present embodiment, a first end of the current acquisition module 3 is configured to input the voltage $V_{in}$, and a second end of the current acquisition module 3 is connected to the first end of the switch K1.

Alternatively, the first end of the current acquisition module 3 is connected to the second end of the switch K1, and the second end of the current acquisition module 3 is connected to the first end of the current control module 1 and the first end of the inductor L.

Figure 5:
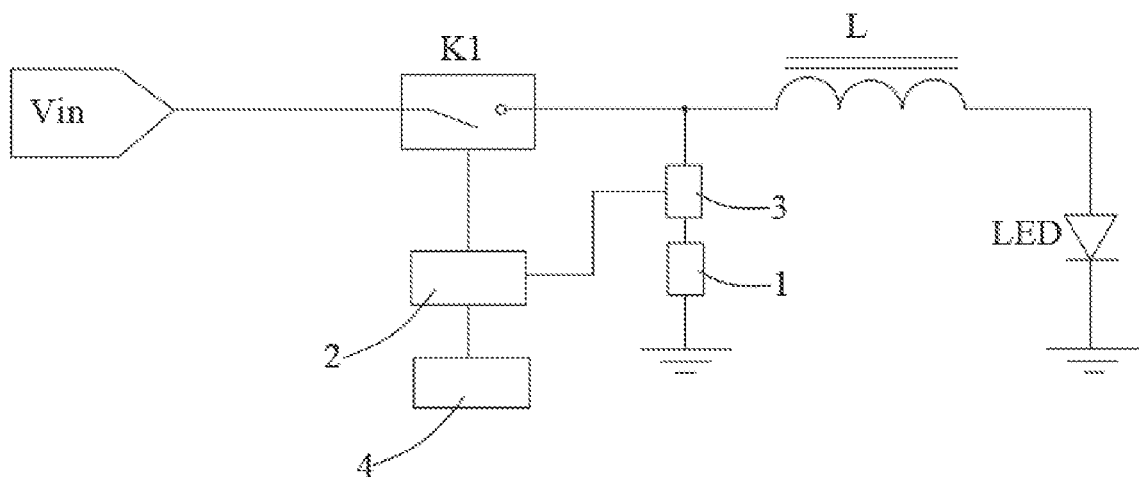
FIG. 5 is another structural diagram of the device for reducing jitter of a light source under low brightness according to one embodiment.

As shown in FIG. 5, if the current acquisition module 3 is arranged on a branch circuit where the current control module 1 is located, the current acquisition module 3 thus is on the current loop when the inductor L is discharged, but not on the current loop when the inductor L is charged. In such configuration, the current acquisition module 3 can only acquire a loop current when the inductor L is discharged. Therefore, during the brightening process of the LED light source under low brightness, at least one discharging process of the inductor L is required, then the current acquisition module 3 can detect the current, and based on the detected current, the signal control module 2 can be controlled to control the switch K1 to be connected or disconnected, so that the LED light source works normally. That is, the inductor L needs to be charged and discharged repeatedly during brightening of the LED light source under low brightness. However, during the charging-discharging conversion of the inductor L, although the current tends to rise as a whole, the current will fluctuate in a small range. Just as FIG. 1 shown, in this case, sawteeth will appear on the image of the current i_LED on the LED light source during the current rising process under low brightness, namely, when the LED light source is brightened under low brightness, the current ripples appear during the current rising process.

Figure 6:
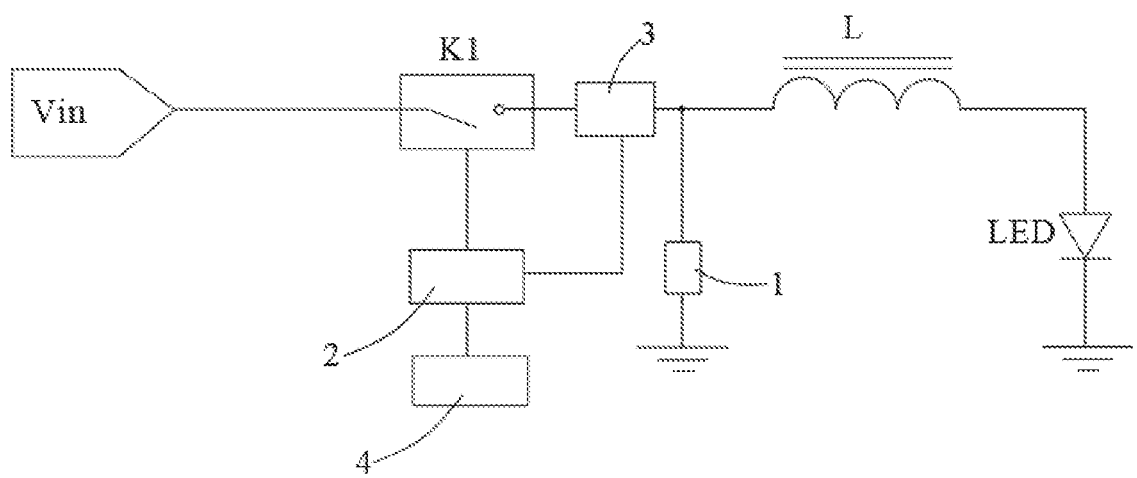
FIG. 6 is another structural diagram of the device for reducing jitter of a light source under low brightness according to one embodiment.
Figure 7:
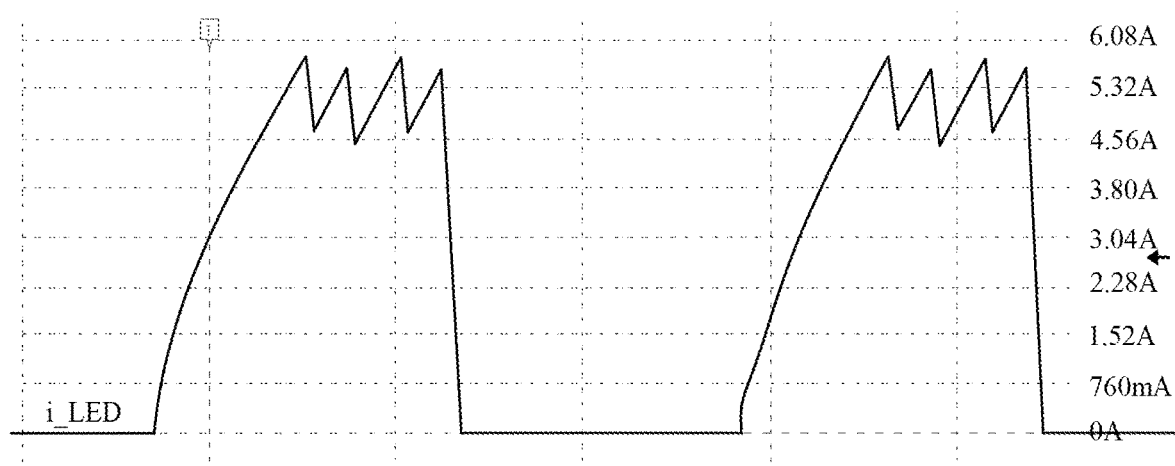
FIG. 7 is another diagram showing current i_LED change of an LED light source with time according to one embodiment.

Preferably, as shown in FIG. 2 and FIG. 6, the current acquisition module 3 may be directly connected to the switch K1, and specifically, may be disposed at both ends of the switch K1. That is, the current acquisition module 3 is arranged in the current loop in which the inductor L is charged, but not in the current loop in which the inductor L is discharged. The current acquisition module 3 only detects the loop current when the inductor L is charged. The current threshold of the current acquisition module 3 can be pre-set as a stable current value of the LED light source after completing light adjusting under low brightness. After the switch K1 is connected, the inductor L is charged, when the current acquisition module 3 detects that the current in the loop steadily rises to the pre-set current threshold, namely, reaches the stable current value of the LED light source after completing light adjusting under low brightness, the current acquisition module 3 sends the current signal to the signal control module 2. In the process that the current rises to the current threshold, the current on the LED light source rises steadily due to the absence of the discharging of the inductor L. Therefore, as shown in FIG. 7, no sawteeth appear when the current i_LED on the LED light source rises, i.e. no current ripples appear.

After receiving the current signal, the signal control module 2 outputs a disconnection signal to the switch K1 to disconnect the switch K1, the inductor L is discharged, the current control module 1 is then in conducting state. The current loop in this situation includes the current control module 1, the inductor L and the LED light source, and the current continues to flow to the LED light source. The signal control module 2 continues to control the switch K1 to be connected or disconnected. The inductor L is charged and discharged repeatedly, and the current on the LED light source fluctuates to a small extent in the range of the current threshold. Therefore, as shown in FIG. 7, the current i_LED fluctuates within a certain current range after a stable rise, which generates current ripples.

It can be seen from the above that the current acquisition module 3 is only required to detect the loop current when the inductor L is charged, and the current threshold of the current acquisition module 3 is pre-set as the stable current value of the LED light source after completing light adjusting under low brightness, the current ripple in the process that the current of the LED light source rises to the current threshold can be eliminated.

It should be noted that the current acquisition module 3 may be arranged in different positions, which are not listed in detail in the present embodiment.

According to the present embodiment, the stable current value of the LED light source after completing light adjusting under low brightness may be preferably the rated maximum current $i_{max}$ of the LED light source.

Preferably, the pre-set current threshold may be between 4 A and 6 A.

In one PWM period, the current on the LED light source continues to rise within the time for the current to rise to the rated maximum current $i_{max}$ of the LED light source, no current ripples appear, and no flicker and jitter thus appears when the LED light source becomes brightened in this process. However, the inductor L is subsequently required to repeatedly charge and discharge to maintain the current about $i_{max}$, the repeated charging and discharging of the inductor L inevitably causes a small amplitude change in the current, which can generate current ripples. Therefore, it is possible to reduce the current ripples generated in one PWM period by appropriately shortening the time when the current is maintained about $i_{max}$. Preferably, the ratio T of the time for the current in the LED light source to rise within one PWM period to the PWM period $T_{PWM}$ is set between 0.2 and 0.4, so that by appropriately increasing the value of T, the time for the current on the LED light source not to generate current ripples can be prolonged and the time with current ripples generated when the current needs to be maintained stable subsequently is shortened, thereby prolonging the time for the LED light source changes brightness smoothly.

According to the present embodiment, the current control module 1 is a diode D1, a cathode of the diode D1 is connected to the first end of the inductor L and the second end of the switch K1, and an anode of the diode D1 is grounded.

Figure 8:
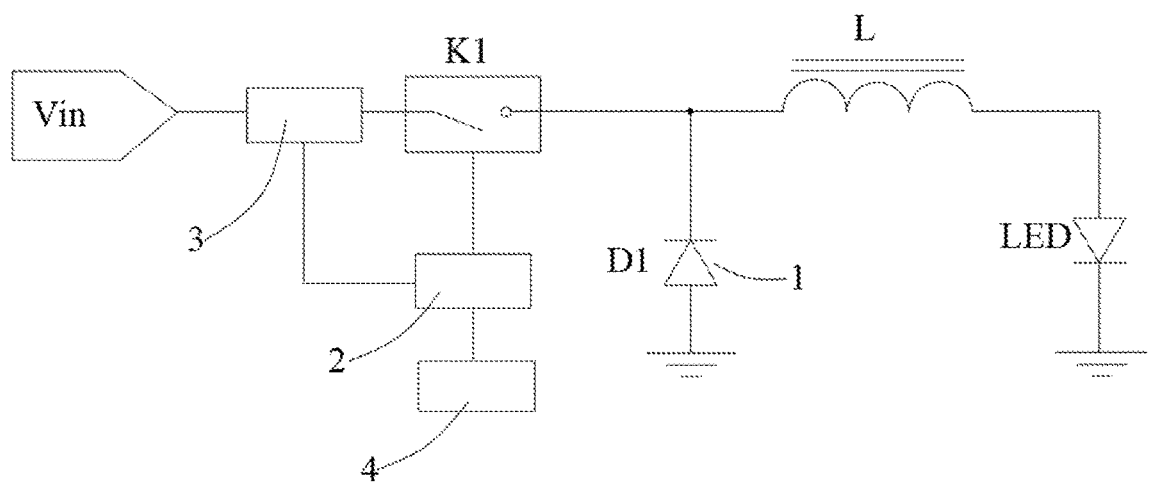
FIG. 8 is another structural diagram of the device for reducing jitter of a light source under low brightness according to one embodiment.

As shown in FIG. 8, in this embodiment, preferably, the diode D1 is selected as the current control module 1.

It should be noted that the LED light source in the present embodiment is a light-emitting diode.

The direction of the diode D1 is opposite to the direction of the light-emitting diode of the LED light source according to the present embodiment. Specifically, a current in the light-emitting diode can only flow in a clockwise direction and a current in the diode D1 can only flow in a counter-clockwise direction. When the switch K1 is connected and the inductor L is charged, the current direction is opposite to the direction of the diode D1, the current thus cannot flow into the diode D1, and a current loop includes the switch K1, the inductor L and the LED light source. When the switch K1 is disconnected and the inductor L is discharged, the current direction is the same as the direction of the diode D1, the current can flow into the diode D1, and the current loop includes the diode D1, the inductor L and the LED light source.

Figure 9:
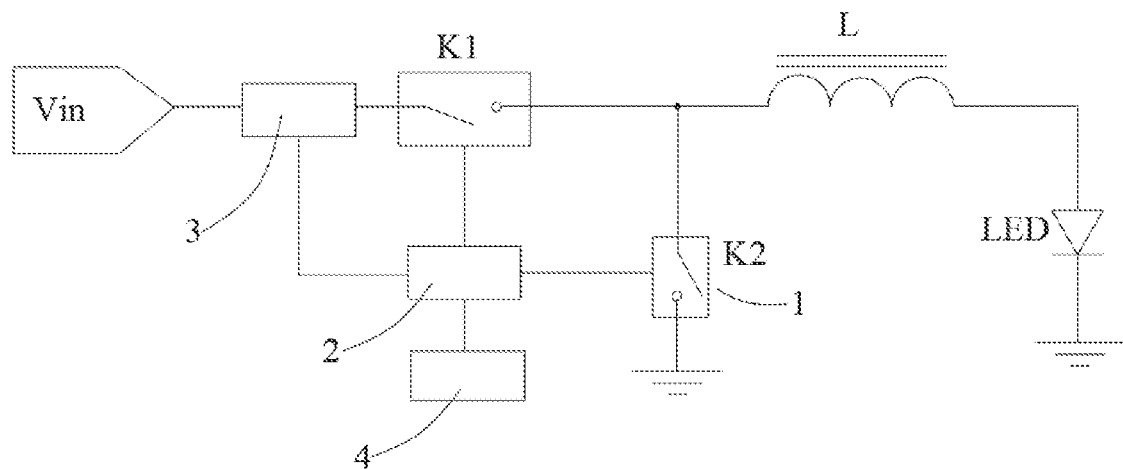
FIG. 9 is another structural diagram of the device for reducing jitter of a light source under low brightness according to one embodiment.

Alternatively, as shown in FIG. 9, the current control module 1 may also be a switch K2, a first end of the switch K2 is connected to the first end of the inductor L and the second end of the switch K1, and a second end of the switch K2 is grounded. When the switch K1 is connected, the switch K2 is disconnected; and when the switch K1 is disconnected, the switch K2 is connected.

Preferably, the switch K2 can also be selected as the current control module 1 in the resent embodiment. The connection and disconnection of switch K2 is opposition to that of the switch K1. When the switch K1 is connected and the inductor L is charged, the switch K2 is disconnected, the current cannot flow into a branch circuit of the switch K2, and a current loop includes the switch K1, the inductor L and the LED light source. When the switch K1 is disconnected and the inductor L is discharged, the switch K2 is connected, the current can flow into the branch circuit of the switch K2, and the current loop includes the switch K2, the inductor L and the LED light source.

Such configuration of the current control module 1 enables to form different current loops during charging and discharging of the inductor L. It is only necessary that the current acquisition module 3 is located where a loop current can be detected when the inductor L is charged, and a current threshold of the current acquisition module 3 is set, the current ripples of the current of the LED light source in the rising process thus can be eliminated.

According to the present embodiment, the switch K1 and the switch K2 may be preferably electronic switches. An electronic switch is an operating unit that controls a circuit to be connected or disconnected by an electronic circuit and a power electronic device, and at least includes a controllable electronic device, such as a thyristor, a transistor, a field effect transistor, a silicon controlled rectifier, a relay, etc.

According to the present embodiment, when the current control module 1 is the switch K2, the switch K2 is also connected to the signal control module 2, so that the signal control module 2 can control the switch K2 to be connected or disconnected.

Preferably, the switch K2 can likewise be controlled by the signal control module 2, when the signal control module 2 sends a connecting signal to the switch K1, a disconnecting signal is also sent to the switch K2 at the same time, so that the switch K1 is connected and the switch K2 is disconnected. Likewise, when the signal control module 2 sends a disconnected signal to the switch K1, a connected signal is also sent to the switch K2 at the same time, so that the switch K1 is disconnected and the switch K2 is connected.

FIG. 4 is a relation diagram showing the relationship between a current i_LED on an LED light source and time t. In FIG. 4, $t_0$ is the time for the current of the LED light source to rise to a first peak point P, and $t_0$ takes 30% of a PWM period to ensure that $t_0$ is subsequent to light adjusting under low brightness, and the period is the reciprocal of the frequency f, then:

$$t_0 = 0.3 T_{pwm} = \frac{0.3}{f}.$$

Point P is the first current peak point of the current rise of the LED light source, and the corresponding peak current $i_{max}$ is known, the peak current $i_{max}$ can be set as a current threshold of the current acquisition module 3 of the present embodiment.

The slope of a straight line OP is the current change rate k of the current of the LED light source, it can be obtained that:

$$k = \frac{i_{pk} - 0}{t_0 - 0} = \frac{i_{pk} \cdot f}{0.3}.$$

In combination with the relational expression of the current change rate k, it can be obtained that:

$$\frac{V_{in} - V_{out}}{l} = \frac{i_{pk} \cdot f}{0.3}.$$

It can be further obtained that:

$$l = (V_{in} - V_{out}) \frac{i_{pk} \cdot f}{0.3}.$$

In a certain application scenario, the difference between the adjusted input voltage $V_{in}$ and the voltage $V_{out}$ of the LED light source is 5 V, the peak current $i_{max}$ is 5.5 A, the frequency f of the control signal PWM is 16 kHz, and then it can be seen from the above formula that the inductance of the inductor L should be adjusted as:

$$l = (V_{in} - V_{out}) \frac{i_{pk} \cdot f}{0.3} = 5 \times \frac{0.3}{5.5 \times 16000} = 17\,\mu\text{H}.$$

By adjusting the inductance of the inductor L to make $t_0$ is 30% of the PWM period, it is ensured that the current can steadily and continuously rise without current ripples when light of the LED light source is in light adjusting under low brightness. Further, if it is possible to continue to increase the inductance of the inductor L appropriately so that the time $t_0$ will be longer, the percentage of $t_0$ in the PWM period is larger, the time for the current to rise steadily is accordingly longer, and it is thus ensured that the current rises steadily in the light adjusting under low brightness. Preferably, the inductance of the inductor L can be set to a maximum value when $t_0$ is 40% of the PWM period.

Therefore, reducing the input voltage $V_{in}$ to approach the output voltage $V_{out}$ can not only improve the energy conversion efficiency, but also can reduce the current change rate k of the current rise on the LED light source, so that no current ripples occur when light of the LED light source is in light adjusting under low brightness. At the same time, increasing the value of the inductor L can make the output current ripples (i.e. the difference between the upper and lower points of the current sawteeth) smaller.

A method for reducing jitter of a light source is provided according to one embodiment, which is used for controlling the current change rate of the LED light source in the device for reducing jitter of the light source under low brightness described above, which includes the steps of reducing the current change rate k of a current flowing through the LED light source so that the current flowing through the LED light source does not generate current ripples in light adjusting under low brightness.

When the switch K1 is connected, the current flows to the LED light source, the current on the LED light source gradually rises and the LED light source gradually becomes bright. However, if the current on the LED light source rises faster, the current on the LED light source will reach to a current threshold before the light adjusting under low brightness is completed, the switch K1 is then disconnected and the current acquisition module 3 will still acquire the current when the inductor L is discharged. By this time, although no current ripples occur in the process that the current on the LED light source rises, current ripples still occur after the rising is completed. While after the current rising is completed, the LED light source is still in the low brightness, the LED light source still has the problem of light flicker and jitter during the light adjusting under low brightness.

Therefore, it is necessary to reduce the rising speed of the current on the LED light source, namely, to reduce the current change rate k of the current flowing through the LED light source, so as to prolong the time for the current to achieve the current threshold. In such way, the current on the LED light source cannot reach the current threshold before the light adjusting under low brightness completed, no current ripples thus occur in the light adjusting under low brightness, Accordingly, the problem of light flicker and jitter of the LED light source when in the light adjusting under low brightness can be avoided.

It can be obtained according to the above mentioned that the current change rate k of the current flowing through the LED light source is specifically:

$$k = \frac{V_{in} - V_{LED}}{l},$$

wherein, $V_{in}$ is the input voltage, $V_{LED}$ is the voltage of the LED light source, and l is the inductance of the inductor L.

It follows that, in the device of the present embodiment, the inductance of the current change rate k of the current flowing through the LED light source depends on the input voltage $V_{in}$ of the device, the inductance of the inductor L of the device, and the voltage $V_{LED}$ on the LED light source.

According to the embodiment, the method of reducing the current change rate k of the current flowing through the LED light source specifically includes increasing the inductance of the inductor L.

According to the embodiment, the method of reducing the current change rate k of the current flowing through the LED light source can also include reducing the input voltage $V_{in}$ to make the input voltage $V_{in}$ approach the voltage $V_{LED}$ of the LED light source.

Based on the formula of the current change rate k, the current change rate k can be reduced by increasing the inductance l of the inductor L and/or decreasing the input voltage $V_{in}$ and/or increasing the voltage $V_{LED}$ across the LED light source, so that the current flowing through the LED light source will not generate current ripples in the light adjusting under low brightness.

When the inductor L and the LED light source in the device of the present embodiment are constant, it is possible to reduce the difference between $V_{in}$ and $V_{LED}$ by reducing the input voltage $V_{in}$ to approach the voltage $V_{LED}$ of the LED light source, thereby reducing the current change rate k. Accordingly, the current flowing through the LED light source will not generate current ripples in the light adjusting under low brightness.

Figure 10:
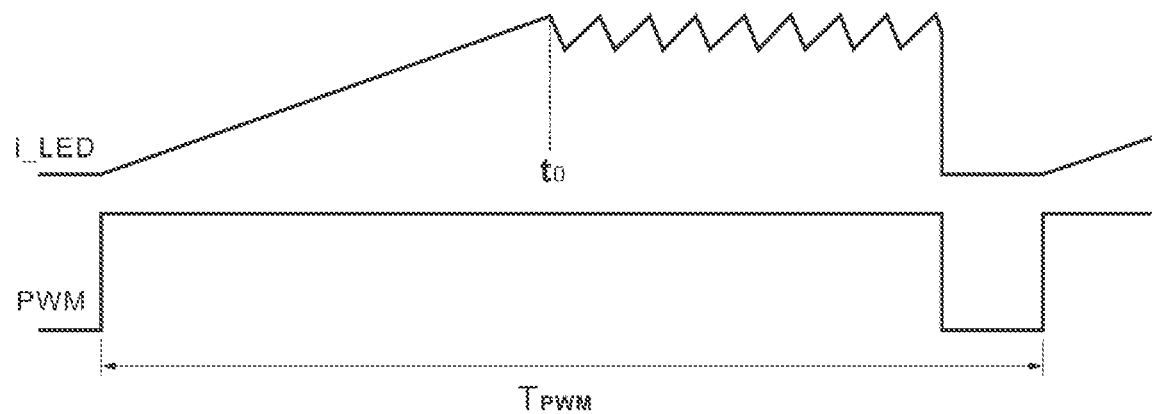
FIG. 10 is a diagram correspondingly showing a current waveform of an LED light source and a PWM signal waveform of one embodiment.

FIG. 10 is a diagram correspondingly shows a current waveform of an LED light source and a PWM signal waveform, wherein $t_0$ is the time for the current of the LED light source to rise to the first peak point, the current value of the first peak point can be pre-set as the current threshold pre-set in the current acquisition module 3, and $T_{PWM}$ is the PWM period of the PWM signal used for controlling the device of the present embodiment. It can be seen that during one PWM period, when the PWM signal is at a high level, the current i_LED of the LED light source continues to rise at a constant current change rate k before time $t_0$, and no sawtooth occurs, namely, no current ripples occur. However, after $t_0$, the current i_LED of the LED light source begins to have current ripples, so that the current will fluctuate up and down within a stable range. It is thus possible to increase $t_0$ by decreasing the slope of the current i_LED, $t_0$ presents after light adjusting of the LED light source under low brightness completed, so that the current of the LED light source can rise at a constant current change rate k without significant current ripples when light adjusting under low brightness, until the light adjusting ends. In such way, when the LED light source is in lighting adjusting under low brightness, the problem of light flicker and jitter due to current ripples will not occur. When the PWM signal is at a low level, the device of the present embodiment stops operating, and the current i_LED of the LED light source is 0.

A light fixture is provided according to one embodiment, which includes at least one device for reducing jitter of the light source under low brightness mentioned above, and a dimmer. The dimmer is used for adjusting the inductance of the input voltage $V_{in}$ of the device and/or the inductance of the inductor L of the device before the LED light source emits light.

Obviously, the above-mentioned embodiments of the present invention are only examples for clearly illustrating the technical solutions of the present invention, and are not intended to limit the specific embodiments of the present invention. Any modifications, equivalent replacements, improvements, etc. made within the spirit and principles of the claims of the present invention shall be included within the protection scope of the claims of the present invention.

The invention claimed is:

1. A device for reducing jitter of a light source under low brightness, comprising an LED light source, an inductor, a current control module, a first switch, a signal control module, a current acquisition module and a signal sending module,
  wherein a first end of the first switch is configured for inputting a voltage, and a second end of the first switch is connected to a first end of the inductor;
  a second end of the inductor is connected to an anode of the LED light source, and a cathode of the LED light source is grounded;
  a first end of the current control module is connected to the second end of the first switch and the first end of the inductor, and a second end of the current control module is grounded, when the first switch is connected, the current control module is in non-conducting state and when the first switch is disconnected, the current control module is in conducting state
  the current acquisition module is configured for detecting a current flowing through the inductor when the inductor is charged, and the current acquisition module is connected to the signal control module and send a current signal to the signal control module according to the current detected;
  the signal control module is connected to the first switch and is configured for controlling the first switch to be disconnected or connected according to the current signal received or a pre-set time threshold;
  the signal sending module is connected to the signal control module, and is configured for sending a PWM control signal to the signal control module, and the signal control module is further configured to judge whether to control the first switch according to the PWM control signal; and
  the voltage input, a voltage of the LED light source, the rated maximum current of the LED light source, the frequency of the PWM control signal and an inductance of the inductor satisfy the relationship:

$$0.2 \le \frac{i_{max} \cdot f \cdot l}{V_{in} - V_{LED}} \le 0.4$$

in which, $V_{in}$ is the voltage input, $V_{LED}$ is the voltage of the LED light source, $i_{max}$ is the rated maximum current of the LED light source, f is the frequency of the PWM control signal, and l is the inductance of the inductor.

2. The device according to claim 1, wherein:

$$\frac{i_{max} \cdot f \cdot l}{V_{in} - V_{LED}} = 0.3$$

in which, $V_{in}$ is the voltage input, $V_{LED}$ is the voltage of the LED light source, $i_{max}$ is the rated maximum current of the LED light source, f is the frequency of the PWM control signal, and l is the inductance of the inductor.

3. The device for reducing low luminance jitter of the light source according to claim 1, wherein the current acquisition module is pre-set a current threshold, when the current detected by the current acquisition module reaches the current threshold, the current signal is sent to the signal control module to control the first switch to be disconnected, and
  the signal control module is pre-set the time threshold, when signal control module detects that time for the first switch being disconnected exceeds the time threshold, the switch is controlled to be connected.

4. The device according to claim 1, wherein a first end of the current acquisition module is configured to input the voltage, and a second end of the current acquisition module is connected to the first end of the first switch, or
  the first end of the current acquisition module is connected to the second end of the first switch, and the second end of the current acquisition module is connected to the first end of the current control module and the first end of the inductor.

5. The device according to claim 1, wherein the current control module is a diode, a cathode of the diode is connected to the first end of the inductor and the second end of the first switch, and an anode of the diode is grounded.

6. The device according to claim 1, wherein the current control module is a second switch, a first end of the second switch is connected to the first end of the inductor and the second end of the first switch, and a second end of the second switch is grounded, and wherein when the first switch is connected, the second switch is disconnected, and when the first switch is disconnected, the second switch is connected.

7. The device according to claim 6, wherein the second switch is further connected to the signal control module, the signal control module is configured to control the second switch to be connected or disconnected.

8. A method for reducing jitter of a light source under low brightness to control a current change rate of the LED light source in the device for reducing jitter of the light source under low brightness according to claim 1, comprising the steps of
  reducing the current change rate of the current flowing through the LED light source to avoid current ripples caused by the current flowing through the LED light source under low brightness.

9. The method according to claim 8, wherein the method for reducing the current change rate of the current flowing through the LED light source comprises: increasing the inductance of the inductor.

10. The method according to claim 8, wherein the method of reducing the current change rate of the current flowing through the LED light source comprises: reducing the voltage input to make the voltage input approach the voltage of the LED light source.

11. A light fixture, comprising at least one device for reducing jitter of the light source under low brightness according to claim 1 and a dimmer, the dimmer is configured to adjust the voltage input of the device and/or the inductance of the inductor of the device before the LED light source emits light.

* * * * *